Aug. 11, 1953

G. HERZOG ET AL 2,648,781

DETECTION AND MEASUREMENT OF RADIATION

Filed June 16, 1950

INVENTORS
GERHARD HERZOG
ROY P. MAZZAGATTI
BY Daniel Stryker
J. H. Grahame
ATTORNEYS Patented Aug. 11, 1953

2,648,781

UNITED STATES PATENT OFFICE 2,648,781

DETECTION AND MEASUREMENT OF RADIATION

Gerhard Herzog and Roy P. Mazzagatti, Houston, Tex., assignors to The Texas Company, New York, N. Y., a corporation of Delaware Application June 16, 1950, Serial No. 168,602

15 Claims. (Cl. 250—83.6)

This invention relates to the detection and measurement of penetrative radiation and more particularly to detectors of the Geiger-Mueller type for measuring the intensity of such radiation as gamma rays.

This invention is in the nature of an improvement over the radiation detector disclosed in Patent No. 2,397,071 of March 19, 1946, to D. G. C. Hare and has as an object the provision of an improved detector of the type disclosed therein wherein a relation between the plate areas and the number of anode apertures therein is established leading to operation of the detector at optimum efficiency.

A further object of the invention is the provision of a novel counter capable of effective operation at relatively high counting rates.

Another object of the invention is the provision of a novel detector characterized by a substantially uniform distribution of suitable electric field strength gradients.

Further objects of the invention will appear from the following description and claims taken in connection with the attached drawings wherein Fig. 1 is a perspective of a plate used in a plate-type counter having only one anode wire.

In brief, this invention is based on the discovery that in counters of the plate type wherein one or more anode wires may be used, there is a definite relationship between certain elements of the counter whereby the optimum number of anode wires and correspondingly the number of anode apertures in each plate can be determined. The invention further contemplates an arrangement wherein the travel of the ion sheath which forms at each count, along the length of the anode may be limited to short segments of the anode, thus making the counter sensitive for a greater period of time and better able to count at relatively high counting rates.

In plate type counters of the character disclosed in the above mentioned Hare patent, one or more conducting cathode plates are provided in spaced parallel relation. Each of the plates is formed with one or more apertures, the apertures of the plates being in longitudinal alignment to permit the passage and positioning of anode wires in directions substantially perpendicular to the plane of the plate or plates.

If but one cathode plate is used, it may be formed in a number of different shapes. For example, the plate may be formed as a spiral ribbon or band or in a zig-zag or accordion pleated shape. If more than one plate is used, the plates may be positioned substantially parallel to one another and spaced a short distance apart. In such case, the plates are so oriented that the apertures therein are in alignment so that an anode wire can be disposed substantially through the center of each series of holes. The plate assembly, which can be termed the cathode, and the anode wires are housed in an envelope of glass, metal or other suitable material, the envelope being preferably filled with a suitable gas.

Figure 2:
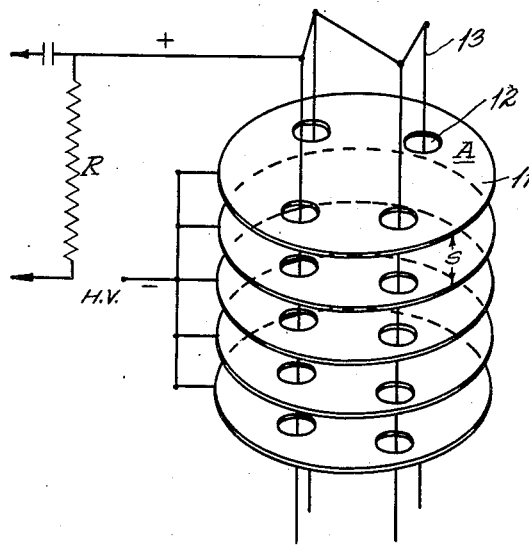
Fig. 2 is a perspective of the plate assembly of a counter having a plurality of anode wires.

Referring to Fig. 2 which shows a plate assembly from the interior of a counter, the assembly, including plates 11 formed with apertures 12 through which are passed anode wires 13, is usually enclosed in a glass envelope, not shown. The envelope contains a suitable gas or gas mixture such as argon and alcohol, at a suitable pressure in the order of 5 to 20 inches of mercury. The anode wire or wires are maintained at a positive potential with respect to the plates and a resistance R is placed in the circuit. Normally, the potential difference between the anode assembly and the cathode plates is nearly but not quite high enough to cause a discharge to take place. If a particle capable of ionizing the gas in the envelope passes through the counter, a discharge will take place with a current flow of the order of a few microamperes. This causes a voltage drop across resistance R and the discharge will cease after a relatively short period of time. By suitably amplifying the sudden voltage drop across resistance R in well-known manner, a mechanical recorder or other device capable of registering the discharge of the counter may be actuated. By reason of the ionization in the counter which forms on discharge in the form of a sheath around the anode wire, and the tendency for this ion sheath to travel along the wire, the counter may be rendered insensitive for an appreciable time during which time there can be no counting. Thus, the unlimited travel of this ion sheath may result in a loss of efficiency.

Because of the large ionization per unit path length of such radiation as cosmic or beta rays, even in the relatively low density of the gas in the counter, the efficiency of the conventional counter for such rays is very nearly 100 per cent. However, the probability of a gamma ray causing ionization in the gas is appreciably less and practically all the counts due to the passage of gamma rays are due to the electrons ejected from the plate cathode by the interaction of the gamma ray with the atoms of the cathode material.

The probability of such an interaction taking place will increase with increasing cathode wall thickness, but since the range in the cathode material of an electron receiving energy from the gamma rays is limited, little is gained by making the plate thicknesses any thicker than about twice the average range of the particles.

In such plate type counters as shown in Fig. 2, it has been found that the electric field strength, that is, the electric field established by reason of the difference in potential between the anode wire or wires and the surrounding cathode plates, is relatively low or weak in the spaces between the cathode plates remote from the anode wire or wires and adjacent the wall of the counter. Such distribution of the field is undesirable since more efficient counting can be obtained by a more even field strength distribution throughout the entire counter volume. If there are regions where the field strength is not sufficiently large, as in the regions near the wall of the counter, the ejected electrons may not reach the anode wires and may not initiate a signal. Instead they may drift. They may be lost or may appear later at a wrong time and give rise to spurious counts. This possibility of a counter giving spurious counts is important since it determines the stability of the counter.

All the above including the geometry of the counter, the materials in the counter and the type of radiation being detected go to determine the efficiency of the counter which may be defined as the measure of the number of counts per second per unit volume of counter in a given gamma ray field.

Returning to the question of electric field distribution, it is evident that with a cathode composed of plates of relatively large diameter, the use of only one anode wire in the center of the plate assembly will result in a strong field around the center and a weak field around and close to the outer periphery of each of the plates. With a small cathode plate such as one having a diameter of about 1⅛" and an anode hole diameter of about ½", the non-uniformity of the field is not so evident, but with large cathode plates having diameters in the order of 3" and 4", the "weak" field region is large. To overcome such maldistribution, the cathode plates are formed with a number of apertures in alignment and the anode wires disposed therein. Thus, a number of "high" field regions are established and the overall field distribution is made more uniform so that electrons ejected anywhere in the counter will reach an anode and effect a signal. While it would seem that the number of anode wires could be increased ad infinitum to render the field more uniform, this would reduce the plate area and correspondingly reduce the efficiency of the counter.

It has been found that there is an optimum relation between the number of anode wires and the plate area in the range of which a good field intensity and distribution is obtained as well as a desired amount of plate area.

This relation involves the spacing of the plates $S$ in Fig. 2; the area of the plates $A$ in Fig. 2; and an experience factor $K$. Based on plate 14 of Fig. 1 which has an aperture 15 of a diameter of ½" and an outside diameter of 1⅛", $K$ has been found to have a value of from 4 to 8, preferably about 6. This value of $K$ is based on a plate spacing of from about ⅛" to ¼", preferably 3/16", and a plate hole through which the anode wire extends, of a diameter at least twice the value of $S$ and preferably from three to four times the value of $S$. While not a factor requiring consideration, the diameter of the anode wire usually ranges from 1 to 10 mils.

With the factors disclosed above, the optimum number of substantially uniformly distributed holes, $n$, in a cathode plate can be determined by the following formula:

$$n = \frac{A}{\frac{\pi}{4}S^2K^2} = \frac{4A}{\pi S^2 K^2}$$

where
$A$ = plate area
$S$ = spacing between plates
$K$ = constant

With plates of annular shape with an inside diameter $Di$ and outside diameter $Do$, the formula can be modified as follows:

$$n = \frac{\frac{\pi}{4}(Do^2 - Di^2)}{\frac{\pi}{4}S^2K^2} = \frac{Do^2 - Di^2}{S^2K^2}$$

Figure 1:
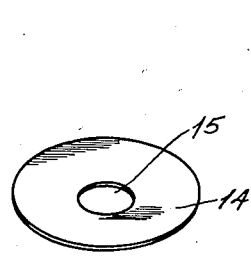

Applying the first formula to the plate of Fig. 1 having an outside diameter of 1⅛", $n$ can be determined as follows:

$$n = \frac{A}{\frac{\pi}{4}S^2K^2} = \frac{\frac{\pi}{4}\left(\frac{9}{8}\right)^2}{\frac{\pi}{4}\left(\frac{3}{16}\right)^2(6)^2} = \frac{\frac{81}{64}}{\frac{81}{64}} = 1$$

For a plate having an outside diameter of 2", $$n = \frac{\frac{\pi}{4}(2)^2}{\frac{\pi}{4}\left(\frac{3}{16}\right)^2(6)^2} = 3$$

For a plate having an outside diameter of 2½", $$n = \frac{\frac{\pi}{4}\left(\frac{5}{2}\right)^2}{\frac{\pi}{4}\left(\frac{3}{16}\right)^2(6)^2} = 5$$

For a plate having an outside diameter of 3", $$n = \frac{\frac{\pi}{4}(3)^2}{\frac{\pi}{4}\left(\frac{3}{16}\right)(6)^2} = 7$$

For a plate having an outside diameter of 4", $$n = \frac{\frac{\pi}{4}(4)^2}{\frac{\pi}{4}\left(\frac{3}{16}\right)^2(6)^2} = 13$$

When it is considered that the area of a plate of 1⅛" diameter is about 1 square inch and $n$ for the plate is 1, it becomes evident that $n$ is approximately equal to the area of the plate in square inches or the equivalent. This is confirmed by the following table showing the value of $n$ for the above plates.

Table

| Plate Diameter, inches | $n$ | Approximate Area (A) in square inches |
|---|---|---|
| 2 | 3 | 3.1 |
| 2½ | 5 | 4.9 |
| 3 | 7 | 7.1 |
| 4 | 13 | 12.6 |

While the measurements herein are indicated in inches, it is to be understood that equivalents may be substituted therefor.

The above relationships establish the optimum compromise between the plate area which is desired to be at a maximum because of its interception of radiation and the reduction in that plate area by reason of the number of apertures provided therein and the corresponding number of anode wires required to make the field sufficiently uniform in strength.

The invention further contemplates an improvement in a counter whereby its efficiency at high counting rates is increased. In counters of the Geiger-Mueller type, the ionization occurs principally in a sheath about the anode wire and, when initiated, spreads along the length of the wire. Where the wire is of appreciable length, it is desirable to limit the length of travel of the ion sheath since this ion sheath renders the counter insensitive. This limiting is especially desirable in the event it is desired to operate the counter at high counting rates. Otherwise, the appreciably long insensitive periods of the counter would result in the failure of the counter to count an appreciable amount of radiation.

Figure 3:
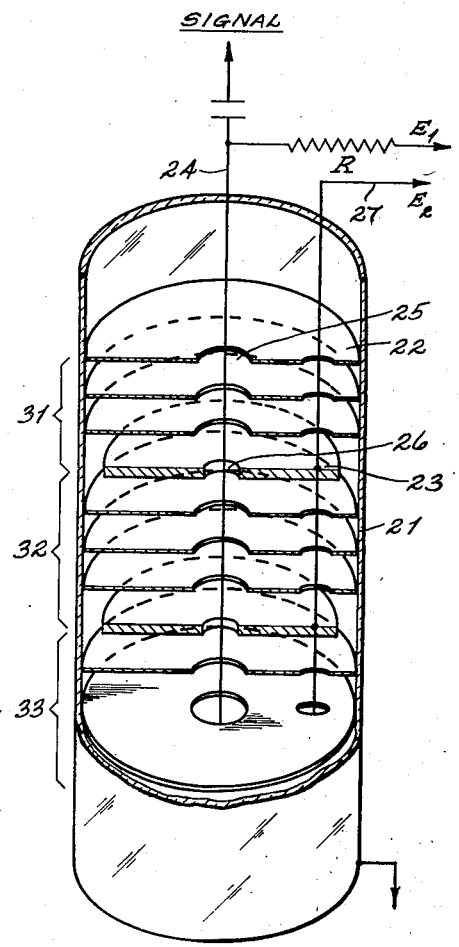
Fig. 3 is a perspective of a multi-plate counter divided into separate chambers, a portion of the counter being cut away to show the interior thereof.

The manner in which the travel of the ion sheath is limited in the present invention can be explained by reference to Fig. 3. In Fig. 3, the detector there shown includes an envelope 21 of suitable material, a series of cathode plates 22, a series of spaced conducting plates or conductors 23 of appreciable thickness, i. e., of the order of two to three times the thickness of the cathode plates, these plates being mounted between groups of cathode plates and substantially parallel thereto but of slightly less diameter as shown. An anode wire 24 is positioned in aligned apertures 25 in plates 22 and in apertures 26 in plates 23, it being noted that apertures 26 are of appreciably less diameter than apertures 25. A bus bar 27 passing through aligned apertures in plates 22 is connected to plates 23. The counter is filled with gas at a reduced pressure as previously described.

In this type of counter, the travel of ions along the anode wire is blocked by a variation in the electrical field strength in the gas surrounding the wire, this variation being such that the field strength adjacent plates 23 is below that which will sustain progressive ionization. Assuming that anode wire 24 is at the operating potential $E_1$ of the counter and that cathode plates 22 are at normal operating potential, plates 23 are established at a potential $E_2$ such that the potential difference between anode wire 24 and each of plates 23 provides an electrical field in apertures 26 of a strength that will not sustain ionization along the anode wire and will function to block travel of the ion sheath. In this manner, it can be said that sections 31, 32 and 33 of the counter are separated from one another as regards the travel of ions along the anode wire.

Obviously, the counter can be divided into as many sections as desired by interposing a sufficient number of plates 23.

Bus bar 27 connecting plates 23 is of a size such that it will not set up a high field strength between it and any of the cathode plates. All the plates may be held in position by suitable insulators, not shown.

While Fig. 3 illustrates a detector with only one anode wire, it is to be understood that this ion travel control feature is applicable as well to detectors of the plural anode type such as shown in Fig. 2.

From the above it is believed evident that by the present invention, an optimum compromise between plate size and field distribution in counters of the plate type is effected. With the added feature of limiting the travel of the ion sheath along the anode wires, the sensitivity and efficiency of the counter is brought even further to a desired maximum.

Obviously many modifications and variations of the invention, as hereinbefore set forth, may be made without departing from the spirit and scope thereof and, therefore, only such limitations should be imposed as are indicated in the appended claims.

We claim:

1. A radiation detector characterized by a substantially uniform distribution of electric field strength gradients and a relatively high efficiency comprising a plurality of substantially parallel cathode plates of substantially equal areas spaced apart from one another, each plate being formed with one or more uniformly distributed apertures, each aperture being of a diameter of at least twice the spacing between adjacent plates, said apertures being disposed in alignment, and an anode wire extending through each of said aligned apertures and insulated from said plates, the number of apertures in each plate being approximately equal to the area of one of said plates when measured in square inches where the spacing between the plates is in the range of about ⅛" to ¼".

2. The detector of claim 1 wherein the diameter of each of said plate apertures is at least twice the spacing between plates.

3. A radiation detector characterized by a substantially uniform distribution of electric field strength gradients and a relatively high efficiency comprising a plurality of substantially parallel cathode plates of substantially equal areas spaced apart from one another, each plate being formed with one or more uniformly distributed apertures, said apertures being disposed in alignment, and an anode wire extending through each of said aligned apertures and insulated from said plates, the number of apertures in each plate being approximately equal to the value $$\frac{4A}{\pi S^2 K^2}$$

where A is the area of one of said plates measured in square inches or the equivalent, $\pi$ is 3.1416, S is the spacing between adjacent plates in inches or the equivalent and is in the range of about ⅛" to ¼", and K is a factor having a value in the range of from 4 to 8.

4. A radiation detector characterized by a substantially uniform distribution of electric field strength gradients and a relatively high efficiency comprising a plurality of substantially parallel cathode plates of substantially equal areas spaced apart from one another, each plate being formed with one or more uniformly distributed apertures, said apertures being disposed in alignment, and an anode wire extending through each of said aligned apertures and insulated from said plates, the number of apertures in each plate being approximately equal to the value $$\frac{4A}{\pi S^2 K^2}$$

where A is the area of one of said plates measured in square inches or the equivalent, $\pi$ is 3.1416, S is the spacing between adjacent plates in inches or the equivalent and is in the range of about $\frac{1}{8}''$ to $\frac{1}{4}''$, K is a factor having a value in the range of from 4 to 8, and the diameters of each of said apertures is at least twice the value of S.

5. A radiation detector characterized by a substantially uniform distribution of electric field strength gradients and a relatively high efficiency comprising a plurality of substantially parallel cathode plates of substantially equal areas spaced apart from one another, each plate being formed with one or more uniformly distributed apertures, said apertures being disposed in alignment, and an anode wire extending through each of said aligned apertures and insulated from said plates, the number of apertures in each plate being approximately equal to the value $$\frac{4A}{\pi S^2 K^2}$$

where A is the area of one of said plates measured in square inches or the equivalent, $\pi$ is 3.1416, S is the spacing between adjacent plates and is about $\frac{3}{16}$ inch or the equivalent and K is a factor having a value of about 6.

6. A radiation detector characterized by a substantially uniform distribution of electric field strength gradients and a relatively high efficiency comprising a plurality of substantially parallel cathode plates of substantially equal areas spaced apart from one another, each plate being formed with one or more uniformly distributed apertures, said apertures being disposed in alignment, and an anode wire extending through each of said aligned apertures and insulated from said plates, the number of apertures in each plate being approximately equal to the value $$\frac{4A}{\pi S^2 K^2}$$

where A is the area of one of said plates measured in square inches or the equivalent, $\pi$ is 3.1416, S is the spacing between adjacent plates and is about $\frac{3}{16}$ inch or the equivalent, K is a factor having a value of about 6, and the diameter of each of said apertures is at least twice the value of S.

7. A radiation detector characterized by its ability to function efficiently at relatively high counting rates comprising a cathode including a series of substantially parallel spaced plates, each plate being formed with at least one aperture, said apertures being in alignment, and an anode wire positioned in each of said aligned apertures and insulated from said plates, said anode wire and said cathode plates being maintained at predetermined different potentials to crease a field of predetermined strength about said anode wire, and means to produce a field of different strength in a zone adjacent said anode, said field being below that which will sustain progressive ionization along said anode whereby ionization about said anode by radiation intercepted by said detector is limited in travel.

8. A radiation detector characterized by its ability to function efficiently at relatively high counting rates comprising a cathode including a series of substantially parallel spaced plates, each plate being formed with at least one aperture, said apertures being in alignment, and an anode wire positioned in each of said aligned apertures and insulated from said plates, said anode wire and said cathode plates being maintained at predetermined different potentials to create a field of predetermined strength about said anode wire, and means to set up a third potential different from the potentials of said cathode and said anode at a zone adjacent said anode, said last named potential being of a value to produce a field in said zone of a different strength from the remainder of said field, said zone field strength being below that which will sustain progressive ionization along said anode whereby ionization developed adjacent said anode by radiation intercepted by said detector is limited in travel.

9. A radiation detector characterized by its ability to function efficiently at relatively high counting rates comprising a cathode including a series of substantially parallel spaced plates, each plate being formed with at least one aperture, said apertures being in alignment, and an anode wire positioned in each of said aligned apertures and insulated from said plates, said anode wire and said cathode plates being maintained at predetermined different potentials to create a field of predetermined strength about said anode wire, and means including a conductor ring about said anode wire and positioned between at least two of said cathode plates to limit progressive ionization along said anode wire, said conductor ring being maintained at a third and different potential to create a field strength about said anode wire adjacent said conductor ring of a value insufficient to sustain progressive ionization.

10. The detector of claim 9 wherein said conductor ring is in the form of a plate positioned substantially parallel to said cathode plates.

11. The detector of claim 9 wherein said conductor ring is formed with an aperture of lesser diameter than the apertures in said cathode plates.

12. A radiation detector characterized by substantially uniform distribution of electric field strength gradients and a relatively high efficiency at high counting rates comprising a plurality of substantially parallel cathode plates of substantially equal areas, said cathode plates being spaced apart from one another, each plate being formed with one or more uniformly distributed apertures, each aperture being of a diameter of at least twice the spacing between adjacent plates, said apertures being arranged in alignment with one another, and an anode wire positioned in each of said aligned apertures and insulated from said plates, said cathode plates and said anode wire being maintained at predetermined different potentials to set up a field of predetermined strength about said anode wire, the number of apertures and the number of anode wires being approximately equal to the area of one of said plates when measured in square inches or the equivalent when the spacing between the cathode plates is in the range of $\frac{1}{8}''$ to $\frac{1}{4}''$, and means positioned between at least two of said cathode plates and adjacent said anode wire and spaced therefrom and at a potential different from that of said anode wire and said cathode plates and of a value to set up a local field strength insufficient to sustain progressive ionization along said anode wire.

13. A radiation detector characterized by a substantially uniform distribution of electric field strength gradients and a relatively high efficiency at high counting rates comprising a plurality of substantially parallel cathode plates of substantially equal areas, said cathode plates being spaced apart from one another, each plate being formed with one or more uniformly distributed apertures, said apertures being arranged in alignment with one another, and an anode wire positioned in each of said aligned apertures and insulated from said plates, said cathode plates and said anode wire being maintained at predetermined different potentials to set up a field of predetermined strength about said anode wire, the number of apertures and the number of anode wires being approximately equal to the value $$\frac{4A}{\pi S^2 K^2}$$

where A is the area of one of said plates measured in square inches or the equivalent, $\pi$ is 3.1416, S is the spacing between adjacent plates in inches or the equivalent and is in the range of about ⅛" to ¼", and K is a factor having a value in the range of 4 to 8, and a ring about said anode wire between two adjacent cathode plates, said ring being maintained at a potential different from those of said anode wire and said cathode plates and of a value to set up a local field of a strength below that at which progressive ionization along said wire will occur.

14. The detector of claim 12 wherein the diameter of the apertures in the cathode plates is at least twice the spacing between adjacent plates.

15. The detector of claim 12 wherein the diameter of the apertures in said plates is at least twice the spacing between adjacent plates and inside diameter of said ring is less than the diameter of said plate apertures.

GERHARD HERZOG.
ROY P. MAZZAGATTI.

References Cited in the file of this patent

UNITED STATES PATENTS

| Number | Name | Date |
|---|---|---|
| 2,397,073 | Hare et al. | Mar. 19, 1946 |
| 2,397,661 | Hare | Apr. 2, 1946 |
| 2,457,781 | Metten et al. | Dec. 28, 1948 |

OTHER REFERENCES

Geiger Counter Tubes—Friedman, Proceedings of the I. R. E., vol. 37, #7—July 1949, pp. 803–806.